United States Patent
Kolonia (10) Patent No.: US 12,320,467 B2
(45) Date of Patent: Jun. 3, 2025

(54) SWIVEL MOUNT ASSEMBLY

(71) Applicant: New Product Development Concepts, LLC, Alpha, NJ (US)

(72) Inventor: Brian J. Kolonia, Bath, PA (US)

(73) Assignee: New Product Development Concepts, LLC, Alpha, NJ (US)

( * ) Notice: Subject to any disclaimer, the term of this patent is extended or adjusted under 35 U.S.C. 154(b) by 0 days.

(21) Appl. No.: 18/863,002

(22) PCT Filed: Jun. 14, 2022

(86) PCT No.: PCT/US2022/033328
§ 371 (c)(1),
(2) Date: Nov. 5, 2024

(87) PCT Pub. No.: WO2023/244211
PCT Pub. Date: Dec. 21, 2023

(65) Prior Publication Data
US 2025/0116368 A1    Apr. 10, 2025

(51) Int. Cl.
*F16M 11/14* (2006.01)
(52) U.S. Cl.
CPC .................................. *F16M 11/14* (2013.01)
(58) Field of Classification Search
CPC ....................................................... F16M 11/14
See application file for complete search history.

(56) References Cited

U.S. PATENT DOCUMENTS

| | | | |
|---|---|---|---|
| 1,559,716 A | * | 11/1925 | Lingle .................... G01C 15/00 248/163.1 |
| 4,382,572 A | * | 5/1983 | Thompson ................ B60R 1/04 403/56 |

(Continued)

FOREIGN PATENT DOCUMENTS

| | | |
|---|---|---|
| CN | 209943843 U | 1/2020 |
| CN | 212617326 U | 2/2021 |
| JP | 2018-056663 A | 4/2018 |

OTHER PUBLICATIONS

International Search Report for PCT/US2022/033328, Korean Intellectual Property Office, Completed Mar. 13, 2023 (3 pages).

(Continued)

*Primary Examiner* — Monica E Millner
(74) *Attorney, Agent, or Firm* — Michael Crilly, Esquire (57) ABSTRACT

A swivel mount assembly for securing a device to a support element is presented. The assembly includes arm, ball portions, and collar. The arm has an exterior surface. Each ball portion includes a center portion with outer and inner surfaces bounded by sides disposed between ends and a flange portion extending outwardly from each side. The collar includes faces separately disposed within an aperture with a socket along each face. Each socket includes a surface extending into the collar at the face. The arm is disposed between the ball portions. The inner surface of each ball portion engages the arm. The outer surface of each ball portion engages one socket. The arm is swivelable with respect to the collar. The flange portions of one ball portion are moveable with respect to the flange portions of other ball portion. The flange portions limit rotation of the ball portion within the socket.

21 Claims, 5 Drawing Sheets

(56) References Cited

U.S. PATENT DOCUMENTS

| | | | | |
|---|---|---|---|---|
| 5,251,859 | A * | 10/1993 | Cyrell | F16C 11/0604 403/90 |
| 6,170,967 | B1 * | 1/2001 | Usher | F21V 21/35 200/227 |
| 6,439,515 | B1 * | 8/2002 | Powers | F16M 13/04 248/129 |
| 7,156,358 | B2 * | 1/2007 | March | F16M 13/02 403/90 |
| 7,753,329 | B2 * | 7/2010 | Hanson | F16M 11/126 248/278.1 |
| 8,608,120 | B2 * | 12/2013 | Chen | F16M 11/14 403/56 |
| 10,258,026 | B2 * | 4/2019 | Thomas | F16M 11/2014 |
| 11,781,588 | B2 * | 10/2023 | Leborgne | F16C 11/10 403/90 |
| 11,820,298 | B2 * | 11/2023 | Grant | H04N 23/60 |
| 2003/0190050 | A1 * | 10/2003 | Lee | H04R 1/025 381/386 |
| 2005/0236540 | A1 | 10/2005 | Bennett | |
| 2005/0265711 | A1 * | 12/2005 | Heibel | F16M 11/42 396/419 |
| 2013/0021539 | A1 | 1/2013 | Austin et al. | |
| 2022/0280856 | A1 * | 9/2022 | Baker | F16M 11/048 |

OTHER PUBLICATIONS

Written Opinion of the International Searching Authority for PCT/US2022/033328, Korean Intellectual Property Office, Completed Mar. 13, 2023 (4 pages).

International Preliminary Report on Patentability for PCT/US2022/033328, Korean Intellectual Property Office, Completed Oct. 11, 2024 (3 pages).

* cited by examiner

SWIVEL MOUNT ASSEMBLY

REFERENCE TO RELATED APPLICATIONS

This application is a national phase to PCT Application No. PCT/US2022/033328 filed Jun. 14, 2022 which is incorporated in its entirety herein by reference thereto.

FEDERALLY SPONSORED RESEARCH AND DEVELOPMENT

None.

FIELD OF THE INVENTION

The disclosure generally relates to a mounting device, and more particularly to a mount assembly attachable to a support element wherein the mount assembly has a swivelable arm.

BACKGROUND OF THE INVENTION

A variety of swivel-capable mount assemblies are known within the art. In one example, a mount includes a link rotatably attached at each end to a knuckle wherein each knuckle is further rotatably attached to one of a base, a sensor mount, or a plate. The mount is attachable to a support element. This and other assemblies incorporate components and functionality which cause the mounting solutions to be heavy, bulky, and expensive.

Accordingly, what is required is a swivel mount assembly which is less heavy, less bulky, and less expensive than presently known mounting solutions enabling swivel functionality.

SUMMARY OF THE INVENTION

An object of the disclosure is a swivel mount assembly which is less heavy, less bulky, and less expensive than presently known mounting solutions enabling swivel functionality.

In accordance with some embodiments, the swivel mount assembly includes an arm, a pair of ball portions, and a collar. The arm has an exterior surface. Each ball portion includes a center portion with an outer surface and an inner surface bounded by a pair of sides disposed between a pair of ends and a flange portion extending at each side. The collar includes a pair of faces separately disposed on the collar within an aperture of the collar with a socket at each face. Each socket includes a surface which extends into the collar at the face. The arm is disposed between the ball portions. The inner surface of each ball portion engages the arm. The outer surface of each ball portion engages one socket. The arm is swivelable with respect to the collar. The flange portions of one ball portion are moveable with respect to the flange portions of the other ball portion. The collar is contactable by the flange portions so as to limit rotation of the ball portion within the socket.

In accordance with other embodiments, the inner surface engages the arm slidingly along the exterior surface.

In accordance with other embodiments, the outer surface engages the socket slidingly along the surface.

In accordance with other embodiments, the collar is contactable by the flange portions at the face.

In accordance with other embodiments, the collar includes a bracket and a base.

In accordance with other embodiments, the bracket has an opening wherein the aperture is defined at least in part by the opening.

In accordance with other embodiments, the base includes a plate portion and an extension portion wherein one face and one socket are on the extension portion.

In accordance with other embodiments, the aperture is bounded by the bracket and the base wherein one face and one socket are on the bracket and one face and one socket are on the base.

In accordance with other embodiments, a gap is disposed between the bracket and the base.

In accordance with other embodiments, the collar is securable to a support element.

In accordance with other embodiments, the support element is a structural framing.

In accordance with other embodiments, the collar is adapted to receive a fastener.

In accordance with other embodiments, the collar includes a bracket and a base wherein the bracket and the base are adapted to receive a fastener.

In accordance with other embodiments, the fastener cooperates with the bracket and the base in use to resist swivel of the arm and rotation of the ball portions.

In accordance with other embodiments, the fastener cooperates with the bracket and the base in use to permit swivel of the arm and rotation of the ball portions.

In accordance with other embodiments, the fastener is a bolt which engages a nut wherein the nut is securable within a slot along a support element.

In accordance with other embodiments, the fastener is disposed within a through hole along each of the bracket and the base.

In accordance with other embodiments, the arm has a center wherein the arm is swivelable about the center within the aperture.

In accordance with other embodiments, the ball portion has a rotational center wherein the ball portion is rotatable about the rotational center as the arm swivels.

In accordance with other embodiments, the rotational centers are offset.

In accordance with other embodiments, the arm has a center wherein the rotational centers are offset from one another and the center.

In accordance with other embodiments, the arm is adapted for securing a device thereto.

In accordance with other embodiments, the device is at least one of a sensor, a tool, or an instrument.

Preferred embodiments of the swivel mount assembly include an arm disposed between a pair of ball portions which separately engage a pair of sockets within a collar. An inside surface of each ball portion is shaped to engage the arm with at least one of sliding or no sliding therebetween. An outside surface of the ball portions is shaped to slidingly engage the socket. Each ball portion further includes a flange portion at one side of the ball portion and another flange portion at other side of the ball portion. The swivel mount assembly is configured so that the arm is positioned between the ball portions with the arm and the ball portions within an aperture of the collar and so that the ball portions are positioned between the sockets. Each flange portion limits rotation of the ball portion relative to the collar so that the ball portion does not slidingly disengage from the socket as the arm is swiveled. The collar is securable to a support element.

Several advantages are offered by one or more embodiments of the disclosure. Components and functionality of the disclosure facilitate light, compact, and affordable mounting solutions. The disclosure is adaptable for use with a variety of support elements, including, but not limited to, a structural framing. The disclosure is applicable for use with a variety of devices, examples including but not limited to, a sensor, a tool, or an instrument. The disclosure is applicable to supporting a device at a position, a location, and/or an orientation. The disclosure has utility within, but not limited to, the fields of art, science, engineering, manufacture, business, and healthcare.

The above and other objectives, features, and advantages of the present disclosure will become better understood from the following description, appended claims, and accompanying drawings, in which like reference numerals designate the same or similar elements.

BRIEF DESCRIPTION OF THE DRAWINGS

Additional aspects, features, and advantages of the disclosure will be understood and will become more readily apparent when the disclosure is considered in light of the following description made in conjunction with the accompanying drawings.

DETAILED DESCRIPTION

Reference will now be made in detail to several embodiments of the disclosure that are illustrated in the accompanying drawings. Wherever possible, same or similar reference numerals are used in the drawings and the description to refer to the same or like parts.

While features of various embodiments are separately described herein, it is understood that such features may be combinable to support other additional embodiments.

Components described herein may be composed of one or more suitable materials.

Components described herein may be manufactured via methods, processes, and techniques understood in the art, including, but not limited to, machining, molding, forming, or three-dimensional printing.

The drawing figures are not necessarily drawn to scale, but instead are drawn to provide a better understanding of the components thereof, and are not intended to be limiting in scope, but to provide exemplary illustrations.

Figure 1:
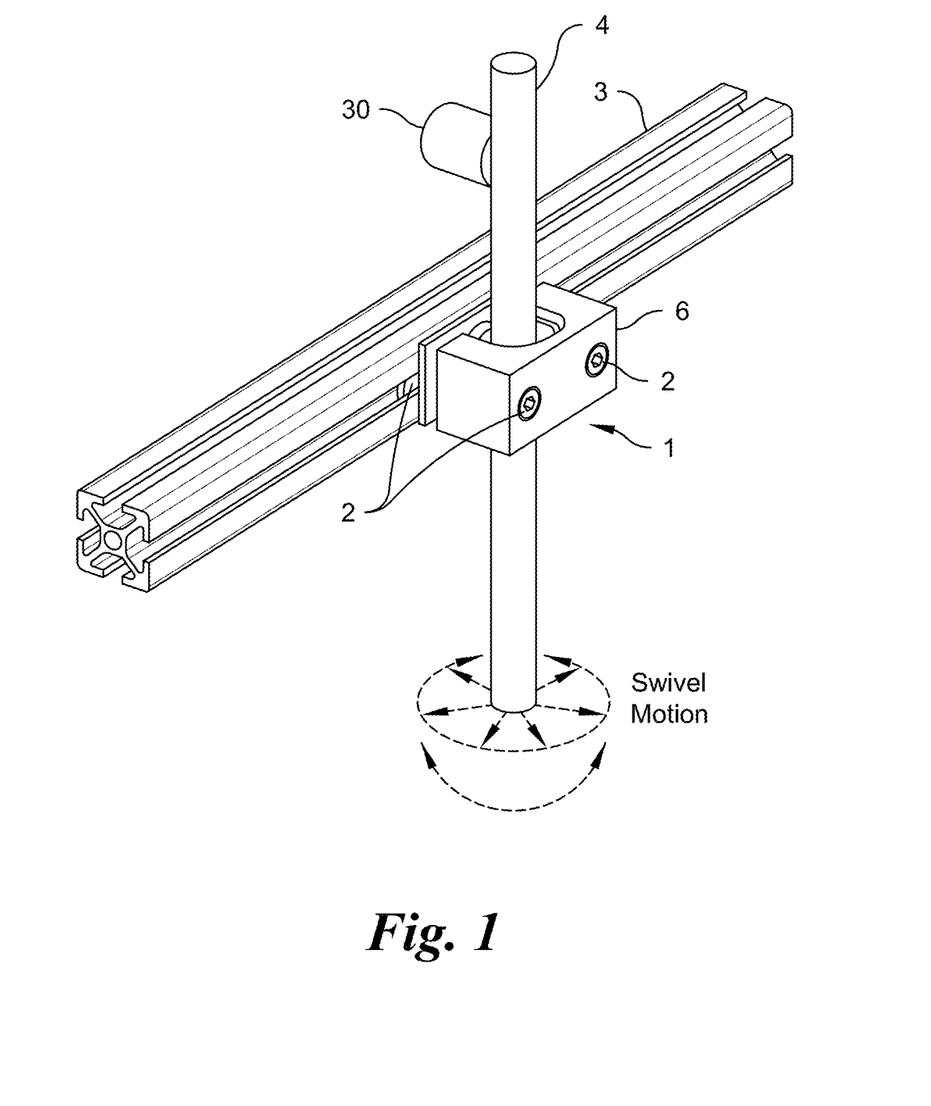
FIG. 1 is a perspective view illustrating a swivel mount assembly configured to secure a device to a support element in accordance with an embodiment of the disclosure.

Referring now to FIG. 1, the swivel mount assembly 1 is securable to a support element 3 via at least one fastener 2 so that an arm 4 of the swivel mount assembly 1 is freely movable with respect to the support element 3. In preferred embodiments, a pair of fasteners 2 secure a collar 6 of the swivel mount assembly 1 to the support element 3. A device 30 may be attached to the arm 4 so that the device 30 is movable with the arm 4 with respect to the collar 6 and the support element 3. The arm 4 is movable so as to swivel longitudinally and/or transversely. Regardless, it is understood that swivel action by the arm 4 includes any motion which allows a user to position, to locate, to support, and/or to orientate a device 30 at a particular point in space.

Referring again to FIG. 1, the support element 3 is broadly understood to allow the swivel mount assembly 1 to be fixable in some fashion thereto. In one non-limiting example, the support element 3 may be a structural framing which permits coupling between the collar 6 and the support element 3 via one or more fasteners 2. One non-limiting example of a structural framing may be an extruded beam, typically aluminum, with a square or rectangular cross section and a T-shaped slot down the centerline of at least one side. In other non-limiting examples, the support element 3 may be a beam, a plate, a wall, an object, or other element capable of having the swivel mount assembly 1 attached thereto and supporting the swivel mount assembly 1 in use.

Referring again to FIG. 1, the arm 4 may be one or more elements which is/are attachable to the device 30 or which permit(s) attachment of the device 30 to the arm 4. The arm 4 may include a variety of shapes and cross sections. The arm 4 may be fixed or changeable to accommodate the end use. In one non-liming example, the arm 4 may be a single, rod-shaped element with a circular cross section. In other non-limiting examples, the arm 4 may include one or more linear segments with or without bend(s), bendable portion(s) or joint(s), curve(s), curvable portion(s) or joint(s), or extendable/collapsible portion(s) or joint(s). Regardless, it is understood that the arm 4 be constructed and/or include one or more features so as to enable use with a device 30.

Figure 2:
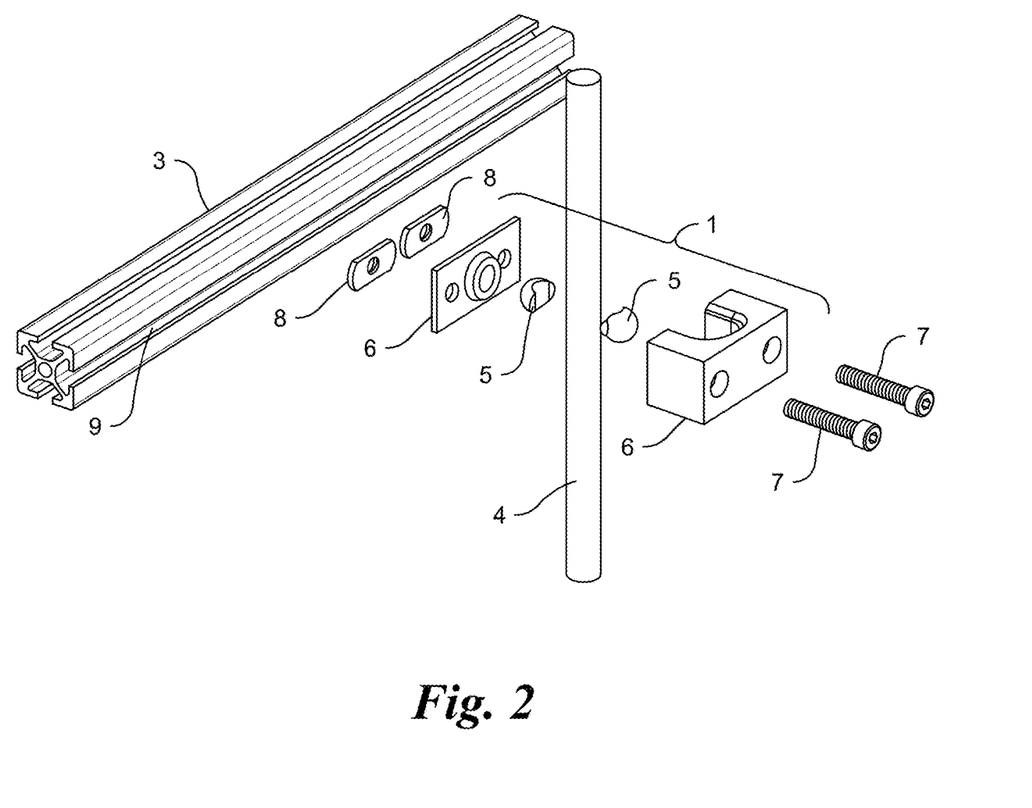
FIG. 2 is an exploded view illustrating a swivel mount assembly including an arm, a pair of ball portions, and a collar mountable to a support element wherein the collar further includes a bracket and a base in accordance with an embodiment of the disclosure.

Referring now to. FIG. 2, the swivel mount assembly 1 in preferred embodiments includes an arm 4, a pair of ball portions 5, and a collar 6. The arm 4 is disposed between the ball portions 5 with the ball portions 5 and at least a portion of the arm 4 disposed within the collar 6. The arm 4 is swivalably disposed within the collar 6 between the ball portions 5. The ball portions 5 are rotatably disposed with respect to the collar 6 between the collar 6 and the arm 4. The ball portions 5 rotate as the arm 4 swivels. In preferred embodiments, the arm 4 and the ball portions 5 directly contact and the ball portions 5 and the collar 6 directly contact. In some embodiments, the arm 4 may be extendable, retractable, and/or movable in a non-swivel fashion with respect to the ball portions 5 and the collar 6.

Referring now to FIGS. 1 and 2, the swivel mount assembly 1 in preferred embodiments may be securable to a support element 3 via a fastener 2 which includes a bolt 7 and a nut 8. The head of the bolt 7 in some embodiments may be recessed within the collar 6. The nut 8 may be couplable to a slot 9 or other suitable structure of the support element 3. It is understood that a fastener 2 may include other designs, components, forms, functions, or features which enable the collar 6 to be secured to the support element 3.

Figure 3:
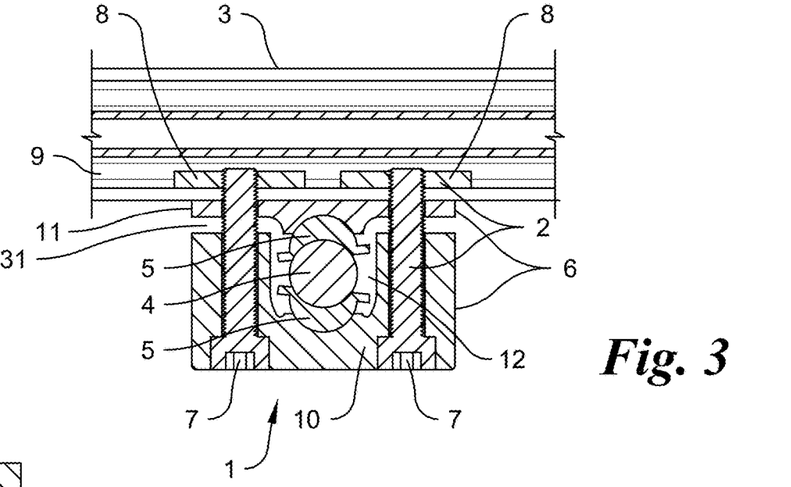
FIG. 3 is a transverse cross-section view illustrating a swivel mount assembly including an arm, a pair of ball portions, and a collar secured to a support element via a pair of fasteners wherein the collar further includes a bracket and a base in accordance with an embodiment of the disclosure.

Referring now to FIGS. 2 and 3, the fastener 2 in some embodiments may disable and enable swivel function of the swivel mount assembly 1. The fastener 2 in use may be tightened so that the arm 4 is fixed. In this locked mode of use, no relative motion is permitted between the arm 4 and the ball portions 5 and between the ball portions 5 and the collar 6. The fastener 2 in use may be loosened so that the arm 4 is swivelable. In this unlocked mode of use, relative motion is permitted between the arm 4 and the ball portions 5 and between the ball portions 5 and the collar 6. In other embodiments, the arm 4 swivels when a force is applied to the arm 4 and the arm 4 does not swivel when the applied force is removed thereby fixing the arm 4 relative to the collar 6.

Referring again to FIGS. 2 and 3, components of the collar 6 hold and support the ball portions 5 so that the ball portions 5 hold and support the arm 4. In preferred embodiments, components of the collar 6 include a bracket 10 and a base 11 which are differently shaped. The bracket 10 and the base 11 cooperate to form an aperture 12 therebetween. The aperture 12 is an opening which permits the arm 4 to extend from one side or both sides of the collar 6, the latter illustrated in FIG. 3. The ball portions 5 and a portion of the arm 4 reside within the collar 6 at the aperture 12. The arm 4 is swivelable within the aperture 12 to the extent permitted by features of the bracket 10 and the base 11. In other embodiments, the base 11 may be similarly shaped as the bracket 10 whereby the bracket 10 and the base 11 cooperate to form the aperture 12. In yet other embodiments, the bracket 10 may be similarly shaped as the base 11 whereby the bracket 10 and the base 11 cooperate to form the aperture 12 with or without spacers or other features or components therebetween which further cooperate to form the aperture 12.

Referring now to FIG. 3, the bracket 10 and the base 11 are adapted to receive the fastener 2. In one non-limiting example, the bolt 7 of the fastener 2 may pass through the bracket 10 and the base 11 so that a portion of the bolt 7 extends into the support element 3, preferably within a slot 9 or other opening along the support element 3. The nut 8 engages the portion of the bolt 7 which extends into the slot 9. The nut 8 mechanically engages the slot 9 so that the bolt 7 moves into the slot 9 as the bolt 7 is tightened with respect to the nut 8 and so that the bolt 7 moves out of the slot 9 as the bolt 7 is loosened with respect to the nut 8. The nut 8 may be movable along the slot 9 under a threshold tightness and non-movable within the slot 9 at or above the threshold tightness. As the bracket 10 moves towards the base 11, fictional contact increases between the arm 4 and the ball portions 5, between one ball portion 5 and the bracket 10, and between the other ball portion 5 and the base 11. As the bracket 10 moves away from the base 11, fictional contact decreases between the arm 4 and the ball portions 5, between one ball portion 5 and the bracket 10, and between the other ball portion 5 and the base 11. In preferred embodiments, a gap 31 between the bracket 10 and the base 11 may decrease as the fastener 2 is tightened and may increase as the fastener 2 is loosened. In preferred embodiments, the dimension of the gap 31 may be adjustable via the fastener 2 so that the arm 4 more freely swivels, the arm 4 less freely swivels, or the arm 4 does not swivel.

Figure 4:
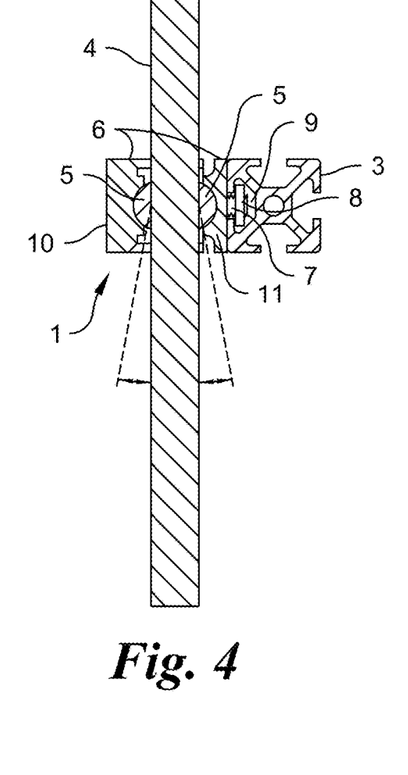
FIG. 4 is a longitudinal cross-section view illustrating a swivel mount assembly including an arm, a pair of ball portions, and a collar secured via a slot along a support element wherein the collar further includes a bracket and a base in accordance with an embodiment of the disclosure.

Referring now to FIG. 4, the ball portions 5 engage the arm 4 between the bracket 10 and the base 11 in preferred embodiments so that the arm 4 may swivel with respect to the collar 6. The shape, dimension(s), and/or feature(s) of the bracket 10 and the base 11 may permit more swivel or less swivel as required by the end use. In some embodiments, the bracket 10 may directly contact the base 11, and the base 11 may directly contact the support element 3. The tightness between the bolt 7 and the nut 8 may be adjusted so that the swivel mount assembly 1 is more slidable along the slot 9, the swivel mount assembly 1 is less slidable along the slot 9, or the swivel mount assembly 1 is not slidable along the slot 9.

Figure 5:
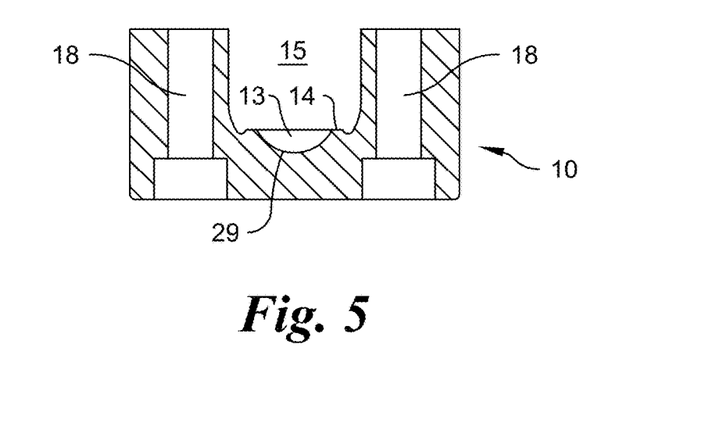
FIG. 5 is a cross-section view illustrating a bracket configured with an opening wherein a socket defined by a surface extends into the bracket along a face between a pair of through holes in accordance with an embodiment of the disclosure.

Referring now to FIG. 5, the bracket 10 in preferred embodiments is configured to include an opening 15. In one non-limiting example, the bracket 10 may be U-shaped with the opening 15 biased to one side so that the structure of the bracket 10 does not completely enclose the side of the opening 15. The bracket 10 may further include one or more through holes 18 either with or without threads. Each through hole 18 is configured to receive a fastener 2, preferably a bolt 7, whereby the depth of the through hole 18 is less than the length of a fastener 2. In preferred embodiments, the bracket 10 includes a pair of through holes 18 which are separately disposed about the opening 15. The bracket 10 further includes a face 14. The face 14 is disposed along a surface of the bracket 10 within the opening 15. The face 14 is positioned within the opening 15, preferably opposite of the open side of the opening 15. A socket 13 is located along the face 14. The socket 13 is defined by a surface 29 which extends into the bracket 10 at the face 14. The surface 29 is configured so as to be engageable by a ball portion 5. In preferred embodiments, the surface 29 is either hemispherical shaped or spherical-cap shaped, although other shapes are possible.

Figure 6:
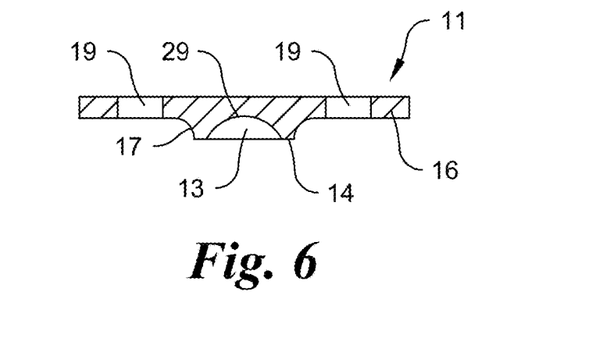
FIG. 6 is a cross-section view illustrating a base with an extension portion along one side of a plate portion wherein a socket defined by a surface extends into the extension portion along a face in accordance with an embodiment of the disclosure.

Referring now to FIG. 6, the base 11 in preferred embodiments includes a plate portion 16 which may be planar shaped, although other shapes are possible. The base 11 may further include an extension portion 17 in some embodiments which extends from one side of the plate portion 16. The base 11 may further include one or more through holes 19 either with or without threads. Each through hole 19 is configured to receive a fastener 2, preferably a bolt 7, whereby the total depth of the through hole 19 of the base 11 and the through hole 18 of the bracket 10 is less than the length of a fastener 2. In preferred embodiments, the base 11 includes a pair of through holes 19 which are separately disposed on the plate portion 16 about the extension portion 17 and positioned to align with the through holes 18 of the bracket 10. The base 11 further includes a face 14. In preferred embodiments, the face 14 is disposed along a surface of the extension portion 17. The face 14 is positioned so as to align with the face 14 of the bracket 10 when the bracket 10 and the base 11 are assembled to complete the collar 6. A socket 13 is located along the face 14. The socket 13 is defined by a surface 29 which extends into the base 11 at the face 14. The surface 29 is configured so as to be engageable by a ball portion 5. In preferred embodiments, the surface 29 is either hemispherical shaped or spherical-cap shaped, although other shapes are possible.

Figure 7:
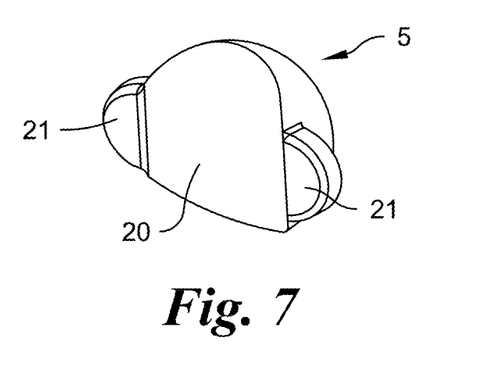
FIG. 7 is a perspective view illustrating a ball portion including a center portion between a flange portion which extends outward from each side of the center portion in accordance with an embodiment of the disclosure.

Referring now to FIG. 7, the ball portion 5 in preferred embodiments includes a center portion 20 disposed between a pair of flange portions 21. Each flange portion 21 outwardly extends from the center portion 20. The flange portions 21 may be either attached to or a part of the center portion 20.

Figure 8:
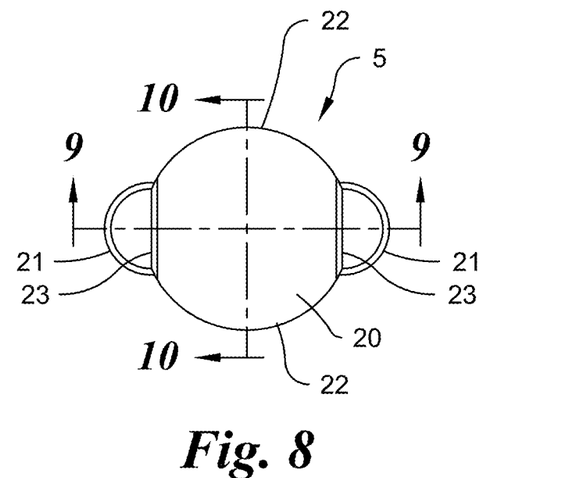
FIG. 8 is a side view illustrating a ball portion including a center portion between a pair of flange portions which extends outward therefrom wherein the center portion is bounded by a pair of sides disposed between a pair of ends in accordance with an embodiment of the disclosure.

Referring now to FIG. 8, the center portion 20 of the ball portion 5 is generally bounded by a pair of sides 23 disposed between a pair of ends 22. In preferred embodiments, the forward side of the center portion 20 is generally circular or substantially circular wherein the circularity is truncated so that each side 23 is flat. In preferred embodiments, the forward side of each flange portion 21 is generally circular or substantially circular wherein the circularity is truncated so that the flange portion 21 contacts the center portion 20 along a flat interface at the side 23.

Figure 9:
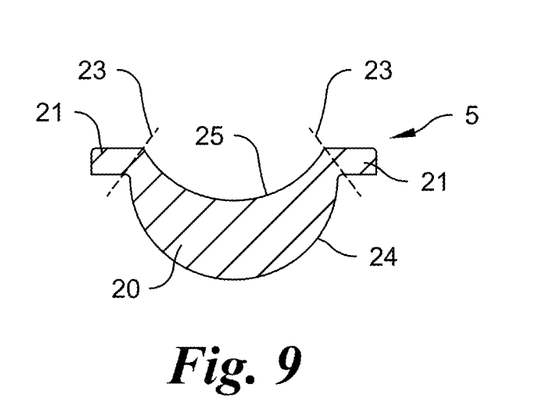
FIG. 9 is a transverse cross-section view of the ball portion of FIG. 8 wherein the center portion includes an outer surface and an inner surface disposed between a pair of flange portions in accordance with an embodiment of the disclosure.

Referring now to FIG. 9, the flange portions 21 of the ball portion 5 extend from the center portion 20 either with or without curvature, the latter represented in FIG. 9. The center portion 20 further includes an outer surface 24 and an inner surface 25. The outer surface 24 and the inner surface 25 are bounded by the ends 22 and the sides 23. In some embodiments, the sides 23 may be angularly disposed as illustrated by the dashed lines. In preferred embodiments, the flange portions 21 are biased so as to outwardly extend adjacent to the inner surface 25.

Figure 10:
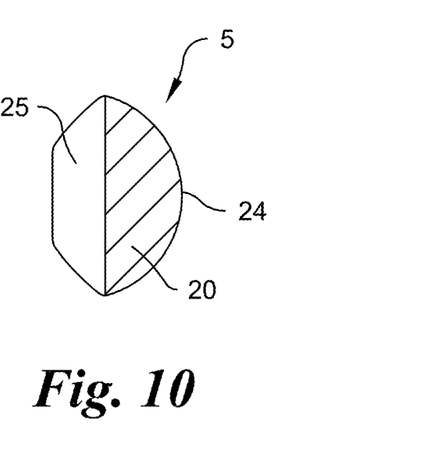
FIG. 10 is a longitudinal cross-section view of the ball portion of FIG. 8 further illustrating an outer surface and an inner surface in accordance with an embodiment of the disclosure.

Referring now to FIGS. 9 and 10, the forward side of the center portion 20 is defined by the inner surface 25 and the back side is defined by the outer surface 24. The inner surface 25 is shaped so as to engage the exterior of the arm 4. The outer surface 24 is shaped so as to engage the surface 29 of a socket 13. In preferred embodiments, the outer surface 24 and the inner surface 25 may be either hemispherical shaped or spherical-cap shaped. The curvatures of the outer surface 24 and the inner surface 25 enable arrangement of the ball portions 5 with the collar 6 and the arm 4 so as to allow for proper function of the swivel mount assembly 1.

Figure 11:
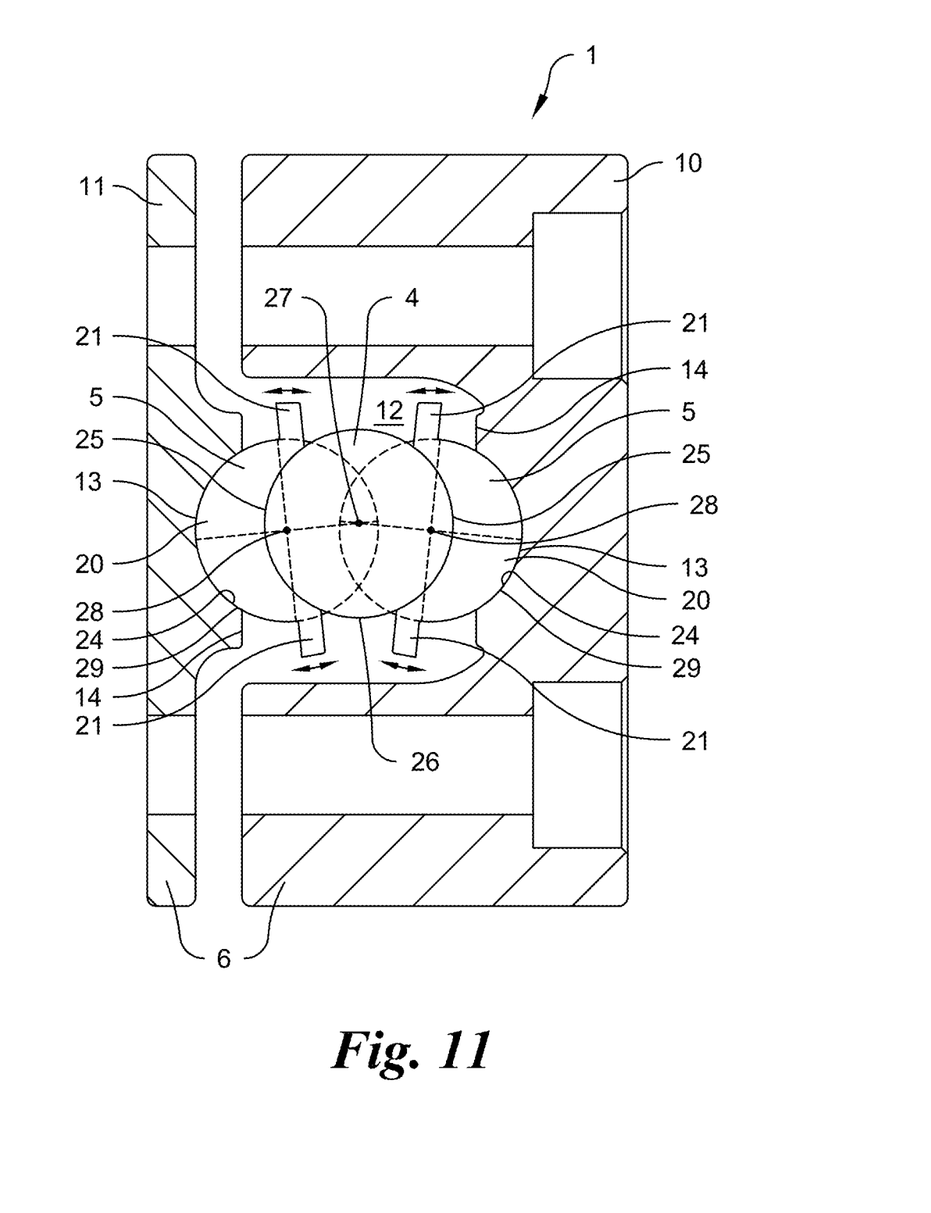
FIG. 11 is a transverse cross-section view illustrating features of a swivel mount assembly including an arm and a pair of ball portions within a collar in accordance with an embodiment of the disclosure.

Referring now to FIG. 11, preferred embodiments of the swivel mount assembly 1 have the center portion 20 of one ball portion 5 directly contact the socket 13 along the face 14 of the bracket 10 and the center portion 20 of the other ball portion 5 directly contact the socket 13 along the face 14 of the base 11. This arrangement places the outer surface 24 of one ball portion 5 in direct contact with the surface 29 along the bracket 10 and the outer surface 24 of the other ball portion 5 in direct contact with the surface 29 along the base 11. In preferred embodiments, the outer surfaces 24 slidingly engage the respective surfaces 29 as permitted by the compressive forces applied at the interfaces by way of the fastener 2.

Referring again to FIG. 11, preferred embodiments of the swivel mount assembly 1 have the center portion 20 of one ball portion 5 directly contact the arm 4 and the center portion 20 of the other ball portion 5 directly contact the arm 4. This arrangement places the inner surface 25 of one ball portion 5 in direct contact with the exterior surface 26 of the arm 4 and the inner surface 25 of the other ball portion 5 in direct contact with the exterior surface 26 of the arm 4. In preferred embodiments, the inner surfaces 25 and the respective portions of the exterior surface 26 slidingly engage as permitted by the compressive forces applied at the interfaces by way of the fastener 2. The sliding engagement may include both relative rotation and relative translation.

Referring again to FIG. 11, each ball portion 5 rotates about a rotational center 28 within the aperture 12. In preferred embodiments, the aperture 12 is defined at least in part by the opening 15 of the bracket 10. The rotational center 28 may correlate at least in part to the design of the ball portion 5 and the socket 13. In one non-limiting example, the rotational center 28 is determined by the curvatures of the surface 29 and the outer surface 24 at contact between the ball portion 5 and either the bracket 10 or the base 11. In preferred embodiments, the rotational centers 28 of the ball portions 5 are offset, that is at different locations from one another within the aperture 12.

Referring again to FIG. 11, the arm 4 swivels about a center 27 within the aperture 12. The center 27 may correlate at least in part to the design of the arm 4, arrangement of ball portions 5 within the aperture 12, and/or relative motion(s) permitted between the arm 4 and the ball portions 5. In one non-limiting example, the center 27 corresponds to the geometric center of the circular cross section of a rod-shaped arm 4 disposed between a pair of identically-shaped ball portions 5. In preferred embodiments, the rotational centers 28 of the ball portions 5 are offset, that is at differ locations from one another and the center 27 within the aperture 12. In other embodiments, the rotational centers 28 and the center 27 may or may not be coaxially aligned. In yet other embodiments, the center 27 may be movable with respect to the rotational centers 28 in use of the swivel mount assembly 1.

Referring again to FIG. 11, the swivel mount assembly 1 in use permits each ball portion 5 to rotate with respect to at least one of the arm 4 and the collar 6 as the arm 4 is swiveled within the aperture 12. As the flange portions 21 rotate with each ball portion 5 within the aperture 12, a flange portion 21 may contactingly engage the collar 6. In one non-limiting example, a flange portion 21 of the ball portion 5 between the bracket 10 and the arm 4 may contact the bracket 10 preferably at the face 14. In another non-limiting example, a flange portion 21 of the ball portion 5 between the base 11 and the arm 4 may contact the base 11 preferably at the face 14. The flange portions 21 are sized, shaped, and positioned so that contact between a flange portion 21 and one of the bracket 10 or the base 11 avoids a rotational condition which might allow a ball portion 5 to separate from a socket 13. In preferred embodiments, the flange portions 21 along one ball portion 5 are separate from the flange portions 21 along the other ball portion 5. This preferred arrangement permits the flange portions 21 of one ball portion 5 to be separately and independently moveable with respect to movement of the flange portions 21 of the other ball portion 5.

While the disclosure is susceptible to various modifications and alternative constructions, certain illustrative embodiments are shown in the drawings and are described in detail herein. It should be understood, however, there is no intention to limit the disclosure to the specific embodiments disclosed, but on the contrary, the intention is to cover all modifications, alternative constructions, combinations, and equivalents falling into the spirit and scope of the disclosure.

What is claimed is:

1. A swivel mount assembly comprising:
   (a) an arm with an exterior surface;
   (b) a pair of ball portions, each said ball portion includes a center portion with an outer surface and an inner surface bounded by a pair of sides disposed between a pair of ends and a flange portion extending at each said side; and
   (c) a collar includes a pair of faces separately disposed on said collar within an aperture of said collar with a socket at each said face, each said socket includes a surface which extends into said collar at said face;
   wherein:
   said arm disposed between said ball portions,
   said inner surface of said center portions engage said arm,
   said outer surface of each said center portion engages one said socket,
   said arm being swivelable with respect to said collar as said center portions slidingly move within said sockets,
   said flange portions extend outwardly in opposite directions from each said center portion within said aperture,
   said flange portions being interposed between said faces and rotatingly movable in direction of said faces,
   said flange portions of said center portion being contactable with said face about said surface of said socket engaged by said center portion,
   said center portion engages said socket so that both said flange portions of said ball portion cannot simultaneously contact said face,
   said flange portions and said center portions being rotatingly movable within said aperture as said arm swivels,
   said flange portions of said ball portion being rotatingly movable in opposite directions as said center portion slidingly moves within said socket so that one said flange moves toward said flange of other said ball portion at one said side of said center portions while one said flange moves away from said flange of other said ball portion at other said side of said center portions,
   said center portions engage said arm so that both said flange portions of one said ball portion cannot simultaneously contact both said flange portions of other said ball portion,
   said face of said collar being contactable by one of said flange portions of said ball portion within said aperture so that said center portion does not slidingly disengage from said socket as said arm swivels.

2. The swivel mount assembly of claim 1, wherein said inner surface engages said arm slidingly along said exterior surface.

3. The swivel mount assembly of claim 1, wherein said collar comprises a bracket and a base.

4. The swivel mount assembly of claim 3, wherein said bracket having an opening, said aperture defined at least in part by said opening.

5. The swivel mount assembly of claim 3, wherein said base comprises a plate portion and an extension portion, one said face and one said socket on said extension portion.

6. The swivel mount assembly of claim 3, wherein said aperture being bounded by said bracket and said base, one said face and one said socket on said bracket, one said face and one said socket on said base.

7. The swivel mount assembly of claim 3, wherein a gap being disposed between said bracket and said base.

8. The swivel mount assembly of claim 1, wherein said collar being securable to a support element.

9. The swivel mount assembly of claim 8, wherein said support element being a structural framing.

10. The swivel mount assembly of claim 1, wherein said collar being adapted to receive a fastener.

11. The swivel mount assembly of claim 1, wherein said collar comprises a bracket and a base, said bracket and said base being adapted to receive a fastener.

12. The swivel mount assembly of claim 11, wherein said fastener cooperates with said bracket and said base in use to resist swivel of said arm and rotation of said ball portions.

13. The swivel mount assembly of claim 11, wherein said fastener cooperate with said bracket and said base in use to permit swivel of said arm and rotation of said ball portions.

14. The swivel mount assembly of claim 11, wherein said fastener being a bolt which engages a nut, said nut securable within a slot along a support element.

15. The swivel mount assembly of claim 11, wherein said fastener being disposed within a through hole along each of said bracket and said base.

16. The swivel mount assembly of claim 1, wherein said arm having a center, said arm being swivelable about said center within said aperture.

17. The swivel mount assembly of claim 1, wherein each said ball portion having a rotational center, said ball portion being rotatable about said rotational center as said arm swivels.

18. The swivel mount assembly of claim 17, wherein said rotational centers being offset.

19. The swivel mount assembly of claim 17, wherein said arm having a center, said rotational centers being offset from one another and said center.

20. The swivel mount assembly of claim 1, wherein said arm being adapted for securing a device thereto.

21. The swivel mount assembly of claim 20, wherein said device being at least one of a sensor, a tool, or an instrument.

* * * * *